US007669414B2

(12) United States Patent
Loeffler

(10) Patent No.: US 7,669,414 B2
(45) Date of Patent: Mar. 2, 2010

(54) HYDRAULIC ENERGY RECOVERY SYSTEM WITH DUAL-POWERED AUXILIARY HYDRAULICS

(75) Inventor: John M. Loeffler, Olive Branch, MS (US)

(73) Assignee: Parker-Hannifin Corporation, Cleveland, OH (US)

( * ) Notice: Subject to any disclaimer, the term of this patent is extended or adjusted under 35 U.S.C. 154(b) by 297 days.

(21) Appl. No.: 11/692,698

(22) Filed: Mar. 28, 2007

(65) Prior Publication Data

US 2007/0227801 A1 Oct. 4, 2007

Related U.S. Application Data

(60) Provisional application No. 60/786,793, filed on Mar. 28, 2006.

(51) Int. Cl.
*F16D 31/02* (2006.01)

(52) U.S. Cl. .......................................... 60/414; 60/419

(58) Field of Classification Search .................. 60/413, 60/414, 416, 419; 180/165
See application file for complete search history.

(56) References Cited

U.S. PATENT DOCUMENTS

| | | | |
|---|---|---|---|
| 4,441,573 A * | 4/1984 | Carman et al. | 60/413 |
| 4,590,767 A | 5/1986 | Gardner, Jr. | |
| 4,813,510 A | 3/1989 | Lexen | |
| 5,794,734 A | 8/1998 | Fahl et al. | |
| 5,865,028 A | 2/1999 | Klauk et al. | |
| 6,170,587 B1 | 1/2001 | Bullock | |
| 6,378,301 B2 | 4/2002 | Endo et al. | |
| 6,668,953 B1 | 12/2003 | Reik et al. | |
| 6,725,581 B2 | 4/2004 | Naruse et al. | |
| 6,854,268 B2 | 2/2005 | Fales et al. | |
| 2004/0118623 A1 | 6/2004 | Shore et al. | |
| 2004/0173396 A1 | 9/2004 | Rush et al. | |
| 2004/0251067 A1 | 12/2004 | Gray, Jr. et al. | |

FOREIGN PATENT DOCUMENTS

| | | |
|---|---|---|
| DE | 3303881 | 8/1984 |
| DE | 10128583 | 12/2002 |
| JP | 11157422 | 6/1999 |
| JP | 2001268704 | 9/2001 |

* cited by examiner

*Primary Examiner*—Michael Leslie
(74) *Attorney, Agent, or Firm*—Renner, Otto, Boisselle & Sklar, LLP

(57) ABSTRACT

A power transfer system for a vehicle that comprises a an internal combustion engine, one or more drive wheels, and power transfer apparatus transfers power from the prime mover to the wheels for propelling the vehicle. The system further comprises an auxiliary hydraulic pump that has a drive shaft that coupled to a power take-off unit driven by engine, and to an auxiliary hydraulic motor powered by hydraulic fluid supplied from a hydraulic energy storage device such as an accumulator. As a result, the auxiliary hydraulic pump can be powered by hydraulic fluid from the accumulator when the prime mover is not operating, or by the prime mover when operating. A tandem arrangement of one way clutches can be employed to avoid the need to disconnect the auxiliary hydraulic pump from the prime mover during operation of the auxiliary hydraulic motor, and vice versa.

18 Claims, 1 Drawing Sheet

FLOW RESTRICTOR
55
50
A
20
46
CONTROLLER
HIGH PRESSURE MANIFOLD AND HYDRAULIC CIRCUITRY
ACCUMULATOR
ACCUMULATOR
47
52
34
21
37
33
35
23
PRIMARY PUMP/MOTOR
MOTOR/PUMP
22
26
37A
27
29
PRIME MOVER
INPUT SHAFT
TRANSMISSION
DRIVE SHAFT
30
43
39
AUX. PUMPS
37B
MOTOR/PUMP
RESERVOIR
35
HP
PTO
HM
A
23
OIL COOLER
42
62
68
40
70
65
63
60
24

HYDRAULIC ENERGY RECOVERY SYSTEM WITH DUAL-POWERED AUXILIARY HYDRAULICS

RELATED APPLICATIONS

This application claims the benefit of U.S. Provisional Application No. 60/786,793 filed Mar. 28, 2006, which is hereby incorporated by reference in its entirety.

FIELD OF THE INVENTION

The invention herein described relates generally to a vehicle drive system that provides hydraulic energy storage and more particularly to such a system including auxiliary hydraulic circuits and components that can be powered by the vehicle's prime mover (e.g. engine) or by pressurized hydraulic fluid from the hydraulic energy storage. The power delivery system can be used on a variety of vehicle types, including in particular garbage collection vehicles and other vehicles that make frequent starts and stops and which have auxiliary hydraulic circuits.

BACKGROUND OF THE INVENTION

For many years there has been recognition that vehicles could be made more fuel-efficient if the energy normally lost in decelerating or braking the vehicle could be somehow collected, stored and reused to accelerate the vehicle. A relatively large number of prior patents and published patent applications exist which are directed to various aspects of this general approach. Some have proposed to collect and store the energy in hydraulic accumulators and then reuse the energy through fixed or variable displacement hydraulic transmissions. The recovered energy was used to assist or provide vehicle motion.

Some vehicles, such as refuse trucks, had auxiliary hydraulic circuits that were powered by the vehicle's engine through a power take-off unit. Consequently, it was necessary for the engine to be running to operate the auxiliary hydraulic systems on the truck. Typical auxiliary hydraulic circuits included those use to actuate cylinders, power hydraulic motors (other than those associated with vehicle propulsion), etc.

SUMMARY OF THE INVENTION

The present invention enables the use of stored hydraulic energy to power one or more auxiliary (other than vehicle propulsion) hydraulic systems of a vehicle, thereby eliminating the need to keep an internal combustion engine running. In a preferred embodiment, an auxiliary hydraulic pump (also herein referred to as a body hydraulic pump) has a drive shaft that is coupled to a power take-off unit driven by a prime mover, such as an internal combustion engine, and to an auxiliary hydraulic motor powered by hydraulic fluid supplied from a hydraulic energy storage device such as an accumulator. As a result, the auxiliary hydraulic pump can be powered by hydraulic fluid from the accumulator when the prime mover is not operating, or by the prime mover when operating. A tandem arrangement of one way clutches can be employed to avoid the need to disconnect the auxiliary hydraulic pump from the prime mover during operation of the auxiliary hydraulic motor, and vice versa. In particular, a pair of sprag (one-way) clutches can be used such that the auxiliary hydraulic pump will be driven by the output shaft of the power take off or hydraulic motor that is being driven faster.

More particularly, the invention provides a power transfer system for a vehicle that comprises a prime mover, one or more drive wheels, and a power transfer apparatus that transfers power from the prime mover to the wheels for propelling the vehicle. The power transfer apparatus includes a power input shaft connected to the prime mover, a primary hydraulic pump, a hydraulic drive motor, a pump coupling for coupling the primary hydraulic pump to the power input shaft, a motor coupling for coupling the hydraulic drive motor to an output drive shaft for driving the one or more drive wheels, an energy storage device in which energy can be stored, primary hydraulic pump power circuitry for supplying pressurized hydraulic fluid from the primary hydraulic pump to the energy storage device, and hydraulic motor power circuitry for transferring pressurized hydraulic fluid from the energy storage device to the hydraulic drive motor. The system also comprises an auxiliary hydraulic pump for supplying hydraulic fluid to an auxiliary hydraulic system of the vehicle other than one that effects vehicle propulsion, a power take-off device driven by the power input shaft and drivingly connected to a drive shaft of the auxiliary hydraulic pump, and an auxiliary hydraulic motor powered by pressurized hydraulic fluid from the energy storage device and drivingly connected to the drive shaft of the auxiliary hydraulic pump for driving the drive shaft of the auxiliary hydraulic pump when not driven by the power take-off device.

The hydraulic drive motor may be reversely operable as a hydraulic pump when driven by the output drive shaft for braking of the vehicle and to effect energy recovery, and the hydraulic drive motor power circuitry may be operable to transfer pressurized hydraulic fluid from the hydraulic drive motor/pump to the energy storage device when the hydraulic motor/pump is reversely driven during braking, In a preferred embodiment, the power take-off device is coupled to the auxiliary hydraulic pump by a one way clutch, and the auxiliary hydraulic motor is coupled to the auxiliary hydraulic pump by a one way clutch, such that the auxiliary hydraulic pump will be driven by the power take-off device or the auxiliary hydraulic motor that is being driven faster.

As will be appreciated by those skilled in the art, one or more of the principles of the present invention can be applied to any hydraulic drive system employing one or more variable displacement drive motors with or without the feature of hydraulic energy recovery.

Further features of the invention will become apparent from the following detailed description when considered in conjunction with the drawings.

DETAILED DESCRIPTION

Figure 1:
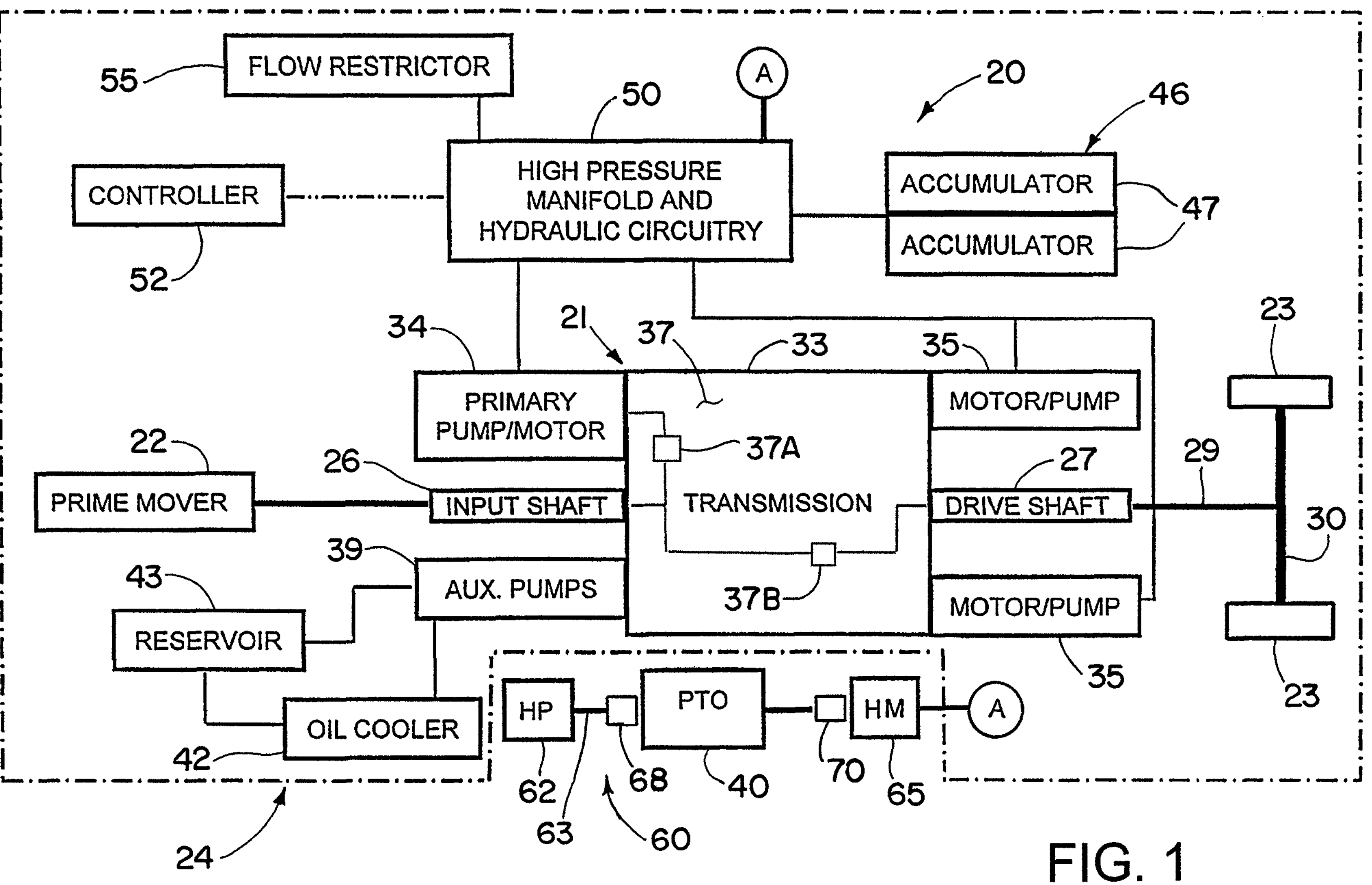
FIG. 1 is a diagrammatic illustration of an exemplary vehicle drive system including a power drive unit according to the invention.

Referring now in detail to the drawings and initially to FIG. 1, an exemplary vehicle drive system according to the present invention is indicated generally by reference numeral 20. The vehicle drive system 20 includes a power drive unit 21 connected between a prime mover 22 and the drive wheel or wheels 23 of a vehicle generally denoted by reference numeral 24. The prime mover preferably is an internal combustion (IC) engine, but other prime movers could also be used, such as gas turbines, electric motors and fuel cells. The power drive unit includes a power input shaft 26 to which the engine is drivingly connected by any suitable means and an output drive shaft 27 drivingly connected to one or more the wheels 23 of the vehicle by any suitable means, such as by a drive shaft 29 and transaxle 30.

The power drive unit 21 is characterized by a housing 33 that provides a mount for one or more primary hydraulic pumps 34 and one or more hydraulic drive motors 35 (two being shown). The embodiment shown in FIG. 1 utilizes one reversible pump/motor unit 34 and two reversible motor/pump units 35 to drive the vehicle in a city or working mode. This arrangement optimizes the packaging of these units into the unitized transmission by using lower cost standard hydraulic units. It also permits more economical gearing from the dual power paths (lower tooth loading), more responsive shift times (less mechanical inertia), a smaller overall package size and weight, and generally smoother operation.

Each pump 34 and motor 35 may be a variable displacement type, and each preferably can be reversely driven to function as a motor or pump, respectively. By way of example, the pumps and motors may be axial piston pumps and motors, wherein displacement of the pump/motor is varied by changing the tilt angle of a tiltable swash plate, in a manner that is well known to those skilled in the art.

The housing contains a transmission assembly 37 to which the power input shaft 26 and output drive shaft 27 are connected. The housing further provides a mount for one or more auxiliary pumps 39 for cooling, lubrication, and/or low pressure systems along with a mounting position for a power take-off (PTO) device 40 that may be used to provide hydraulic power to other parts of the vehicle. The auxiliary pumps may be a stacked arrangement of pumps, particularly positive displacement pumps, driven by a common drive shaft. As depicted in FIG. 1, one auxiliary pump may circulate hydraulic fluid through a cooler 42 and back to a reservoir 43. Another auxiliary pump may be used to supply pressurized fluid to the transmission assembly 37 and/or other drive components for lubrication, and another auxiliary pump may be used to supply low pressure fluid to components of the hereinafter described hydraulic circuits to operate, for example, pilot valves used to control fluid pressure components.

As illustrated in FIG. 1, the primary pump 34 is mounted to one axial end of the housing while the hydraulic motors 35 are mounted to the opposite axial end of the housing. In addition, the auxiliary pumps 39 are mounted to the same axial side of the housing as the primary pump 34. The motors and/or pumps may be otherwise mounted. For example, the primary pump could be separately mounted, such as to the engine.

The vehicle drive system 20 further comprises an energy storage device 46. In the illustrated embodiment the energy storage device is an accumulator system including one or more pressurized fluid accumulators 47, specifically hydropneumatic accumulators. Other energy storage devices may be used such as a mechanical fly wheel or batteries. The accumulators 47 are supplied with pressurized fluid from the primary pump 34 and/or motors 35 by means of a high pressure manifold and fluid circuitry generally indicated at 50. The fluid circuitry 50 is commanded by a system controller 52, more particularly an electronic system controller, to control the flow of pressurized fluid to and from the accumulators 47, the pump 34, motors 35 and other hydraulic components, including a flow restrictor 55, the function of which is discussed below. The system controller may include one or more microprocessors and associated components programmed to carry out the herein described operations. The controller may have various inputs for receiving data from various sensors that monitor various operational parameters of the vehicle and various outputs by which the controller commands various operations.

In a first mode of operation, the position of the vehicle's accelerator and brake pedals may be detected by sensors and act as input commands to the electronic system controller 52. If the desired action is to accelerate, say from a stop position, the electronic system controller 52 can shift the transmission assembly 37 into a hydro low configuration to start the vehicle in motion. The controller may command the high pressure manifold and hydraulic circuitry 50 to supply high pressure fluid from the accumulator system 46 and/or the primary pump 34 (if then operating) to the hydraulic drive motors 35 to drive the output drive shaft 27 through the transmission assembly 58. This in turn will drive the drive wheels 23 of the vehicle to accelerate the vehicle from the stopped position. The displacement of the drive motors may be varied by the controller 52 to control the rate of acceleration to increase or maintain a constant speed (zero acceleration). The drive motors can operate to deliver high torque to the drive wheels of the vehicle.

If the vehicle is already moving and a desired action is to decelerate or brake the vehicle, the electronic system controller 52 directs the high pressure manifold and fluid circuitry 50 to receive high pressure fluid from the drive motors 35 which then will be reversely driven and act as pumps, thereby delivering high pressure fluid back to the accumulator system 46. The hydraulic drive motors, acting as pumps, will generate resistance in the drive train to slow the vehicle down. This action also recovers most of the kinetic energy from the vehicle and stores it in the accumulator system for future use by the drive system or for performing other hydraulically powered work related tasks on the vehicle.

The vehicle may be provided with mechanical brakes that normally will not be needed to decelerate the vehicle, but which will be available for use if the braking force required (such as a panic stop) is greater than that which is being generated by the reversely driven hydraulic motors acting as pumps, or as a back-up in case of a failure in the hydraulic drive system.

Once the vehicle has accelerated to or past an upper end of the hydro low range, such as about 25 mph, the electronic system controller 52 commands the transmission assembly 37 to shift to a hydro high gear ratio.

The transmission assembly 37 as thus far described corresponds to the transmission assembly described in U.S. patent application Ser. No. 11/379,883, which is hereby incorporated herein by reference. Reference may be had to said patent application for further details of the transmission assembly and its manner of operation for propelling and stopping a vehicle. For instance, a transmission assembly or more particularly a pump coupling may include a clutch 37A for selectively drivingly connecting the primary hydraulic pump 34 to the power input shaft 26, and the transmission assembly may include a clutch 37B for selectively drivingly connecting the output drive shaft 27 to the power input shaft 26.

As above indicated, the power take-off (PTO) device 40 is used to provide hydraulic power to other parts of the vehicle such as hydraulic actuators, motors, etc. that are typically operated when the vehicle is stationary or at least independently of the vehicle components involved in the driving of the vehicle from one location to another. In the case of a refuse truck, the power take-off can be used to supply power to the hydraulic cylinders used to compress the refuse in the refuse collection chamber.

In accordance with the invention, one or more hydraulic body circuits 60 may be provided for powering hydraulic components and systems other than those associated with propulsion of the vehicle and typically those that are operated when the vehicle is stationary. Each hydraulic body circuit 60 includes an auxiliary hydraulic pump 62 (also herein referred to as a body hydraulic pump) that has a drive shaft 63 coupled to the power take-off device 40 that is driven by the engine 22, and to an auxiliary hydraulic motor 65 powered by hydraulic fluid supplied from the energy storage device 46. As a result, the auxiliary hydraulic pump can be powered by hydraulic fluid from the accumulators 47 when the engine is not operating, or by the engine via the power take-off device when the engine is running.

In the illustrated preferred embodiment, the PTO device 40 is coupled by a sprag (one-way) clutch 68 to the auxiliary pump drive shaft 63. The auxiliary hydraulic motor 65 likewise is coupled to the drive shaft of the pump by a sprag (one-way) clutch 70. If the PTO device and auxiliary hydraulic motor are both being driven, the auxiliary hydraulic pump will be driven by the PTO device or auxiliary hydraulic motor that is being driven faster. In most instances, however, only one of the PTO device and auxiliary hydraulic motor will be driven (under the control of the controller 52), in which case the other will be idle and the associated one-way clutch will free-wheel.

While other arrangements are contemplated, in the illustrated embodiment the PTO device 40 is drivingly connected to the input shaft 26 through the transmission assembly 37 which may include one or more clutches for disengaging the PTO output shaft from the engine, such as when the engine is not running. As will be appreciated, though, the PTO device can remain drivingly connected to the engine even when the engine is not running.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A vehicle comprising a prime mover, one or more drive wheels, and a power transfer apparatus for transferring power from the prime mover to the wheels for propelling the vehicle, the power transfer apparatus including a power input shaft connected to the prime mover, a primary hydraulic pump, a hydraulic drive motor, a pump coupling for coupling the primary hydraulic pump to the power input shaft, a motor coupling for coupling the hydraulic drive motor to an output drive shaft for driving the one or more drive wheels, an energy storage device in which energy can be stored, primary hydraulic pump power circuitry for supplying pressurized hydraulic fluid from the primary hydraulic pump to the energy storage, and hydraulic motor power circuitry for transferring pressurized hydraulic device fluid from the energy storage device to the hydraulic drive motor; an auxiliary hydraulic pump for supplying hydraulic fluid to an auxiliary hydraulic system of the vehicle other than one that effects vehicle propulsion; a power take-off device driven by the power input shaft and drivingly connected to a drive shaft of the auxiliary hydraulic pump; and an auxiliary hydraulic motor powered by pressurized hydraulic fluid from the energy storage device and drivingly connected to the drive shaft of the auxiliary hydraulic pump for driving the drive shaft of the auxiliary hydraulic pump when not driven by the power take-off device.

2. A vehicle as set forth in claim 1, wherein the hydraulic drive motor is reversely operable as a hydraulic pump when driven by the output drive shaft for braking of the vehicle and to effect energy recovery, and the hydraulic drive motor power circuitry is operable to transfer pressurized hydraulic fluid from the hydraulic drive motor/pump to the energy storage device when the hydraulic drive motor/pump is reversely driven during braking.

3. A vehicle as set forth in claim 2, wherein the power take-off device is coupled to the drive shaft of the auxiliary hydraulic pump by a one way clutch.

4. A vehicle as set forth in claim 3, wherein the auxiliary hydraulic motor is coupled to the drive shaft of the auxiliary hydraulic pump by a one way clutch such that the auxiliary hydraulic pump will be driven by the power take off device or the auxiliary hydraulic motor that is being driven faster.

5. A vehicle as set forth in claim 1, wherein the energy storage device includes at least one hydropneumatic accumulator.

6. A vehicle as set forth in claim 5, the primary hydraulic pump power circuitry and hydraulic motor power circuitry includes hydraulic circuits respectively connecting the primary hydraulic pump and hydraulic motor to the at least one hydropneumatic accumulator.

7. A vehicle as set forth in claim 1, wherein the pump coupling includes a clutch for selectively drivingly connecting the primary hydraulic pump to the power input shaft.

8. A vehicle as set forth in claim 7, wherein the power transfer apparatus includes a clutch for selectively drivingly connecting the output drive shaft to the power input shaft.

9. A vehicle as set forth in claim 1, wherein the prime mover is an internal combustion engine.

10. A power transfer system for a vehicle, comprising a power transfer apparatus for transferring power from a prime mover to the wheels of the vehicle for propelling the vehicle, the power transfer apparatus including a power input shaft connected to the prime mover, a primary hydraulic pump, a hydraulic motor/pump, a transmission assembly including a pump coupling for coupling the primary hydraulic pump to the power input shaft, a motor coupling for coupling the hydraulic motor to the output drive shaft, an energy storage device in which energy can be stored, primary hydraulic pump power circuitry for supplying pressurized hydraulic fluid from the primary hydraulic pump to the energy storage device, and hydraulic motor power circuitry for transferring pressurized hydraulic fluid from the energy storage device to the hydraulic motor; and an auxiliary hydraulic pump for supplying hydraulic fluid to an auxiliary hydraulic system of the vehicle other than one that effects vehicle propulsion; a power take-off device driven by the power input shaft and drivingly connected to a drive shaft of the auxiliary hydraulic pump; and an auxiliary hydraulic motor powered by pressurized hydraulic fluid from the energy storage device and drivingly connected to the drive shaft of the auxiliary hydraulic pump for driving the drive shaft of the auxiliary hydraulic pump when not driven by the power take-off device.

11. A power transfer system as set forth in claim 10, wherein the hydraulic drive motor is reversely operable as a hydraulic pump when driven by the output drive shaft for braking of the vehicle and to effect energy recovery, and the hydraulic drive motor power circuitry is operable to transfer pressurized hydraulic fluid from the hydraulic drive motor/pump to the energy storage device when the hydraulic drive motor/pump is reversely driven during braking.

12. A power transfer system as set forth in claim 11, wherein the power take-off device is coupled to the drive shaft of the auxiliary hydraulic pump by a one way clutch.

13. A power transfer system as set forth in claim 12, wherein the auxiliary hydraulic motor is coupled to the drive shaft of the auxiliary hydraulic pump by a one way clutch such that the auxiliary hydraulic pump will be driven by the power take off device or the auxiliary hydraulic motor that is being driven faster.

14. A power transfer system as set forth in claim 10, wherein the transmission assembly includes an output drive shaft for driving one or more wheels of the vehicle for transfer of power to the one or more wheels.

15. A power transfer system as set forth in claim 10, wherein the energy storage device includes at least one hydropneumatic accumulator.

16. A power transfer system as set forth in claim 15, the primary hydraulic pump power circuitry and hydraulic motor power circuitry includes hydraulic circuits respectively connecting the primary hydraulic pump and hydraulic motor to the at least one hydropneumatic accumulator.

17. A power transfer system as set forth in claim 10, wherein the pump coupling includes a clutch for selectively drivingly connecting the primary hydraulic pump to the power input shaft.

18. A power transfer system as set forth in claim 17, wherein the transmission assembly includes a clutch for selectively drivingly connecting the output drive shaft to the power input shaft.

* * * * *